United States Patent [19]

Urban

[11] 4,383,983

[45] May 17, 1983

[54] METHOD FOR THE REMOVAL OF CARBON OR CARBON COMPOUNDS FROM A WASTE STREAM

[75] Inventor: Peter Urban, Northbrook, Ill.

[73] Assignee: UOP Inc., Des Plaines, Ill.

[21] Appl. No.: 341,921

[22] Filed: Jan. 21, 1982

[51] Int. Cl.³ .................... C01B 17/06; C01B 31/18; C01B 31/26; B01J 37/12

[52] U.S. Cl. .......................... 423/571; 423/415 A; 423/443; 423/444; 423/577; 252/411 R; 252/416; 210/763

[58] Field of Search ................ 423/415 A, 443, 444, 423/571, 574, 577; 252/411 S, 416; 208/57, 58, 108, 215

[56] References Cited

U.S. PATENT DOCUMENTS

| | | | |
|---|---|---|---|
| 3,622,498 | 11/1971 | Stolfa | 208/108 |
| 3,687,629 | 8/1972 | Watkins | 252/411 S X |
| 3,810,972 | 5/1974 | Humphrey et al. | 208/108 |
| 3,932,595 | 1/1976 | Berthaux et al. | 423/443 |
| 3,961,035 | 6/1976 | Mickley | 423/563 |
| 4,280,839 | 7/1981 | Tolley et al. | 252/411 S X |

FOREIGN PATENT DOCUMENTS 54-97598  8/1979  Japan ................ 252/411 S

*Primary Examiner*—Earl C. Thomas
*Attorney, Agent, or Firm*—James R. Hoatson, Jr.; John G. Cutts, Jr.; William H. Page, II

[57] ABSTRACT

A method for the removal of carbon or carbon compounds from a waste stream generated in an unsupported slurry catalyst process utilized for the hydroconversion of heavy hydrocarbonaceous black oil which stream comprises vanadium sulfide, nickel sulfide and carbon or carbon compounds is disclosed. The carbon or carbon compound is removed by contacting the waste stream with sulfur dioxide at oxidizing conditions to yield a solid residue which contains metal sulfides.

14 Claims, No Drawings

METHOD FOR THE REMOVAL OF CARBON OR CARBON COMPOUNDS FROM A WASTE STREAM

BACKGROUND OF THE INVENTION

This invention relates to the recovery and disposal of waste streams generated in an unsupported slurry catalyst process which is utilized for the hydroconversion of heavy hydrocarbonaceous black oil. It particularly relates to a process for the removal of carbon or carbon compounds from a waste stream which comprises vanadium sulfide, nickel sulfide and carbon or carbon compounds.

High metal content hydrocarbons are unsuitable for hydrotreating in a conventional fixed bed hydrotreater because the metals are deposited on the catalyst at a rapid rate which not only physically plugs the flow of the reactants through the reaction zone but masks the small catalytic sites on the catalyst, thus precluding long, uninterrupted operation of the hydrotreater which is highly disruptive of the entire processing complex of which the hydrotreater is a small but important part. The prior art describes processes which are much more adaptable to the hydrotreating of high metals hydrocarbons. In general, a facile method for hydrotreating high metals hydrocarbons is via a catalyst slurry process whereby the hydrocarbon is admixed with hydrogen and a finely divided metal catalyst or metal catalyst precursor and subjected to elevated temperature and pressure in a reaction zone. The reaction zone effluent is separated to yield a hydrotreated hydrocarbon and a sludge or waste stream containing asphaltenes and at least one metal sulfide. At least a portion of this sludge is usually recycled within the process to provide slurry catalyst for the reaction. In order to prevent an undesirable accumulation of refractory hydrocarbonaceous substances and recovered metal compounds, a dragstream is withdrawn from the process. The dragstream generally comprises carbon or carbon compounds and at least one metal sulfide and is from about 1 to about 10 weight percent of the fresh feed stream to the slurry process. Once the dragstream is removed from the process, it must be utilized or discarded. An attractive method to utilize the dragstream is to remove the carbon or carbon compounds completely and recover the metal values which remain.

The prior art has suggested the removal of carbon or carbon compounds from such a dragstream by high temperature oxidation of the carbon or carbon compounds with air or an oxygen-containing gas. This procedure converts the metal sulfides to metal oxides. Generally, the recovery and use of metal is easier and less expensive if the metal ore is in the sulfide form rather than the oxide form. A preferred method therefore would be to recover the metal values in the sulfide form which makes the subsequent separation and use of the metals more convenient.

SUMMARY OF THE INVENTION

The present invention is a method for the removal of carbon or carbon compounds from a waste stream generated in an unsupported slurry catalyst process utilized for the hydroconversion of heavy hydrocarbonaceous black oil which stream comprises vanadium sulfide, nickel sulfide and carbon or carbon compounds and which method comprises contacting the waste stream with sulfur dioxide at oxidizing conditions.

A preferred embodiment of the present invention is a method for the removal of carbon or carbon compounds from a waste stream generated in an unsupported slurry catalyst process utilized for the hydroconversion of heavy hydrocarbonaceous black oil which stream comprises vanadium sulfide, nickel sulfide and carbon or carbon compounds and which method comprises contacting the waste stream with sulfur dioxide at oxidizing conditions to produce a high BTU gas containing carbon disulfide and carbon monoxide.

A second preferred embodiment of the present invention is a method for the removal of carbon or carbon compounds from a waste stream generated in an unsupported slurry catalyst process utilized for the hydroconversion of heavy hydrocarbonaceous black oil which stream comprises vanadium sulfide, nickel sulfide and carbon or carbon compounds and which method comprises: (a) contacting the waste stream with sulfur dioxide at oxidizing conditions to produce a high BTU gas containing carbon disulfide and carbon monoxide; (b) contacting at least a portion of the resulting high BTU gas with an oxygen-containing as to yield a carbon oxide and a sulfur oxide-containing gas stream; and (c) contacting the carbon oxide and sulfur oxide-containing gas stream resulting from step (b) with carbon disulfide to reduce the sulfur oxide and thereby produce elemental sulfur.

Another preferred embodiment of the present invention is a method for the removal of carbon or carbon compounds from a waste stream generated in an unsupported slurry catalyst process utilized for the hydroconversion of heavy hydrocarbonaceous black oil which stream comprises vanadium sulfide, nickel sulfide and carbon or carbon compounds and which method comprises: (a) contacting the waste stream with sulfur dioxide at oxidizing conditions to produce a high BTU gas-containing carbon disulfide and carbon monoxide; (b) contacting at least a portion of the resulting high BTU gas from step (a) with an oxygen-containing gas to yield a carbon oxide and a sulfur oxide-containing gas stream; (c) hydrolyzing at least a portion of the resulting high BTU gas from step (a) to yield a carbon oxide and a hydrogen sulfide-containing gas stream; and (d) reacting at least a portion of the carbon oxide and sulfur oxide containing gas stream from step (b) with at least a portion of the carbon oxide and hydrogen sulfide-containing gas stream from step (c) to thereby produce elemental sulfur.

DETAILED DESCRIPTION OF THE INVENTION

This invention relates to a method for the removal of carbon or carbon compounds from a waste stream containing metal values. More specifically, the invention is concerned with a method for the removal of carbon or carbon compounds from a waste stream generated in an unsupported slurry catalyst process utilized for the hydroconversion of heavy hydrocarbonaceous black oil which stream comprises vanadium sulfide, nickel sulfide and carbon or carbon compounds and which process comprises contacting said waste stream with sulfur dioxide at oxidizing conditions.

As hereinbefore set forth, the present invention is concerned with a method for the removal of carbon or carbon compounds from a waste stream generated in an unsupported slurry catalyst process utilized for the hydroconversion of heavy hydrocarbonaceous black oil. This waste stream generally contains metal sulfides which may have originated from process catalyst precursors, from process catalysts or from metals indigenous to the hydrocarbonaceous block oil which is being processed. Such metals which may be found in a waste stream include those selected from Group V-B, Group IV-B and Group VIII of the Periodic Table. A typical waste stream containing carbon in the form of asphaltenes and at least one finely divided, unsupported metal sulfide which was a drag stream from a high metal hydrocarbon conversion process contained 1.4 weight percent vanadium, 0.12 weight percent nickel and 59.3 weight percent asphaltenes.

According to the present invention, the removal of carbon or carbon compounds from a waste stream as hereinabove described is effected by treating the waste stream with sulfur dioxide at oxidizing conditions. During the carbon oxidation treatment, the sulfur dioxide is present in an amount from about 1 to about 10 times, more preferably from about 1 to about 5 times, the stoichiometric amount required to oxidize the available carbon or carbon compounds. Other oxidizing conditions include a pressure from about atmospheric to about 1000 psig and a temperature from about 900° F. to about 2200° F. for a period of time which may range from about 0.1 to about 20 hours or more in duration.

It is expected that the presence of metal sulfides will catalyze the reaction of sulfur dioxide with the carbonaceous waste stream material. In some cases, it may be advantageous to add elemental sulfur to the reactor wherein the sulfur dioxide is contacted with the carbonaceous waste stream material in order to aid the formation of carbon disulfide and any other reaction products.

The resulting high BTU gas comprises compounds of carbon which principally include carbon disulfide and carbon monoxide with relatively minor amounts of carbonyl sulfide and carbon dioxide. Other minor amounts of the high BTU gas resulting from the contact of sulfur dioxide at oxidizing conditions include hydrogen sulfide, water and elemental sulfur.

The resulting high BTU gas is removed from the remaining residue which comprises any existing metal sulfides. The metal sulfides may then be treated further by any known method to recover and use the metal values as desired.

According to one embodiment of the present invention, at least a portion of the high BTU gas is subsequently oxidized with a source of oxygen to generate heat as well as carbon dioxide and sulfur dioxide. A suitable source of oxygen is air. The resulting carbon dioxide and sulfur oxide is reacted with carbon disulfide to reduce the sulfur oxide and thereby produce elemental sulfur. In the hereinabove steps, the oxygen source and carbon disulfide are provided in amounts which are at least the stoichiometric requirements.

According to another embodiment of the present invention, at least a portion of the high BTU gas is subsequently oxidized with a source of oxygen to generate heat as well as carbon dioxide and sulfur dioxide. A suitable source of oxygen is air. Additionally, at least another portion of the high BTU gas is hydrolyzed to yield a carbon oxide and a hydrogen sulfide stream. A suitable procedure for the hydrolyzing step is to pass the high BTU gas in admixture with steam over a suitable conversion catalyst such as a silica-containing catalyst for example. The oxidized high BTU gas containing sulfur dioxide and the hydrolyzed high BTU gas containing hydrogen sulfide are admixed and reacted to produce elemental sulfur and water. The reaction of hydrogen sulfide and sulfur dioxide may be conducted in any suitable manner. One method includes passing the reactants through a catalyst-packed converter in a manner similar to the Claus process which was originally developed in Germany in about 1880. Another method includes the performance of the reaction in an aqueous media as exemplified by what is known as the wet Claus process.

The process of the present invention is further exemplified by the following illustrative embodiment. This illustration is not present to unduly limit the process of this invention but to further demonstrate the hereinabove description and teachings.

ILLUSTRATIVE EMBODIMENT

A one hundred gram sample of finely divided waste stream generated in an unsupported slurry catalyst process and which waste stream sample comprises 8.5 weight percent of vanadium and nickel, calculated as the sulfide is selected to demonstrate a preferred embodiment of the present invention. The remainder of the waste stream sample comprises high molecular weight and highly carbonaceous residue. This waste stream is contacted with excess sulfur dioxide at a temperature of 1400° F. and a pressure of 15 psig for approximately 100 minutes. The resulting gases comprising carbon sulfide and carbon monoxide are separated from the solid residue.

The resulting gases have a high energy content and are contacted with air at combustion conditions to produce heat, carbon dioxide and sulfur dioxide. The resulting carbon dioxide and sulfur dioxide-containing gas is contacted with excess carbon disulfide to reduce the sulfur dioxide and thereby produce elemental sulfur.

The solid residue remaining after the sulfur dioxide contacting step contains essentially pure vanadium and nickel sulfides.

The foregoing description and illustrative embodiment demonstrate the process of the present invention and the advantages of the use thereof.

I claim as my invention:

1. A method for the removal of carbon or carbon compounds from a waste stream formed in an unsupported slurry catalyst process utilized for the hydroconversion of heavy hydrocarbonaceous black oil which stream comprises vanadium sulfide, nickel sulfide and carbon or carbon compounds and which method comprises contacting said waste stream at oxidizing conditions with sulfur dioxide in an amount from about 1 to about 5 times the stoichiometric amount required to oxidize said carbon or carbon compounds to produce a high BTU gas containing carbon disulfide and carbon monoxide.

2. The method of claim 1 wherein said oxidizing conditions include a temperature from about 900° F. to about 2200° F.

3. The method of claim 1 wherein said oxidizing conditions include a pressure from ambient to about 1000 psig.

4. The method of claim 1 wherein elemental sulfur is present during said contacting of said waste stream with sulfur dioxide at oxidizing conditions.

5. A method for the removal of carbon or carbon compounds from a waste stream formed in an unsupported slurry catalyst process utilized for the hydroconversion of heavy hydrocarbonaceous black oil which stream comprises vanadium sulfide, nickel sulfide and carbon or carbon compounds and which process comprises:
- (a) contacting said waste stream with sulfur dioxide at oxidizing conditions to produce a high BTU gas containing carbon disulfide and carbon monoxide;
- (b) contacting at least a portion of the resulting high BTU gas with an oxygen containing gas to yield a carbon oxide and a sulfur oxide-containing gas stream; and
- (c) contacting the carbon oxide and sulfur oxide-containing gas stream resulting from step (b) with carbon disulfide to reduce the sulfur oxide and thereby produce elemental sulfur.

6. The method of claim 5 wherein said oxidizing conditions include a temperature from about 900° F. to about 2200° F.

7. The method of claim 5 wherein said oxidizing conditions include a pressure from ambient to about 1000 psig.

8. The method of claim 5 wherein said sulfur dioxide is present in an amount from about 1 to about 5 times the stoichiometric amount required to oxidize said carbon or carbon compounds.

9. The method of claim 1 wherein elemental sulfur is present during said contacting of said waste with sulfur dioxide at oxidizing conditions.

10. A method for the removal of carbon or carbon compounds from a waste stream formed in an unsupported slurry catalyst process utilized for the hydroconversion of heavy hydrocarbonaceous black oil which stream comprises vanadium sulfide, nickel sulfide and carbon or carbon compounds and which method comprises:
- (a) contacting said waste stream with sulfur dioxide at oxidizing conditions to produce a high BTU gas containing carbon disulfide and carbon monoxide;
- (b) contacting at least a portion of the resulting high BTU gas from step (a) with an oxygen-containing gas to yield a carbon oxide and a sulfur oxide-containing gas stream;
- (c) hydrolyzing at least a portion of the resulting high BTU gas from step (a) to yield a carbon oxide and a hydrogen sulfide-containing gas stream; and
- (d) reacting at least a portion of the carbon oxide and sulfur oxide-containing gas stream from step (b) with at least a portion of the carbon oxide and hydrogen sulfide-containing gas stream from step (c) to thereby produce elemental sulfur.

11. The method of claim 10 wherein said oxidizing conditions include a temperature from about 900° F. to about 2200° F.

12. The method of claim 10 wherein said oxidizing conditions include a pressure from ambient to about 1000 psig.

13. The method of claim 10 wherein said sulfur dioxide is present in an amount from about 1 to about 5 times the stoichiometric amount required to oxidize said carbon or carbon compounds.

14. The method of claim 10 wherein elemental sulfur is present during said contacting of said waste with sulfur dioxide at oxidizing conditions.

* * * * *